(12) United States Patent
Takahashi

(10) Patent No.: US 6,674,965 B2
(45) Date of Patent: Jan. 6, 2004

(54) ELECTRIC POWER CONTROL DEVICE FOR CAMERA

(75) Inventor: Hiroyuki Takahashi, Tochigi (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 10/073,229

(22) Filed: Feb. 13, 2002

(65) Prior Publication Data

US 2002/0118968 A1 Aug. 29, 2002

(30) Foreign Application Priority Data

Feb. 23, 2001 (JP) .................................... P2001-048137

(51) Int. Cl.[7] .............................. G03B 7/26; G03B 17/00
(52) U.S. Cl. .................... 396/277; 396/85; 396/303
(58) Field of Search ................................ 396/277, 301, 396/303, 85

(56) References Cited

U.S. PATENT DOCUMENTS 5,315,345 A 5/1994 Kawasaki et al.
5,557,365 A * 9/1996 Ohsawa .................... 396/279

* cited by examiner

Primary Examiner—Russell Adams
Assistant Examiner—Arthur Smith
(74) Attorney, Agent, or Firm—Greenblum & Bernstein, P.L.C.

(57) ABSTRACT

An electric power control device for a camera is provided. The electric power control device includes an electric power source, a monitoring processor, a detecting processor and a control processor in a camera body. The electric power source provides power to an accessory, such as a photographing lens that can be attached to the camera body. The monitoring processor monitors the electric power and the detecting processor detects whether the electric power is abnormal based on a signal from the monitoring processor.

2 Claims, 7 Drawing Sheets

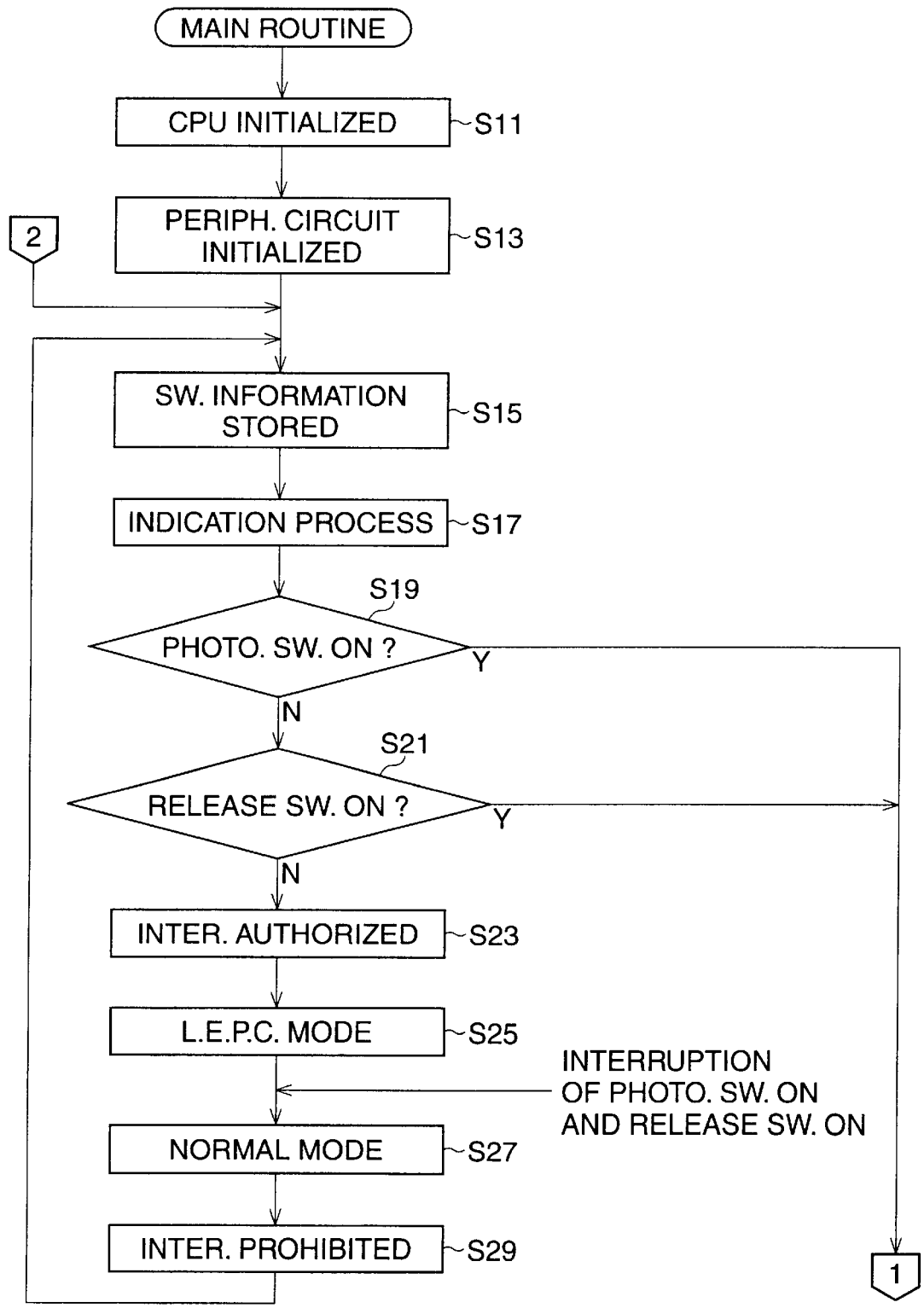

ELECTRIC POWER CONTROL DEVICE FOR CAMERA

BACKGROUND OF THE INVENTION

1. Field of the Invention

The present invention relates to an electric power control device provided in a camera which is constructed in such a manner that a photographing lens, an accessory, and so on can be attached to and detached from a camera body.

2. Description of the Related Art

Conventionally, a camera system has been developed in which a camera body and an accessory including a photographing lens, which can be attached to and detached from the camera body, are arbitrarily assembled. In some camera systems, the photographing lens or the accessory is operated by electric power supplied from the camera body, and the supplied electric power is always monitored in the photographing lens or the accessory, to detect any abnormal state. The monitoring information is transmitted from the photographing lens or the accessory to the camera body. Thus, in the camera body, the check for an abnormal state happens based on the monitoring information. When the abnormal state is recognized, the electric power supply is cut so that a large amount of electric current is prevented from building up.

However, if an electric circuit for monitoring the electric power supply is provided in the photographing lens or the accessory, or if the monitoring information is frequently transmitted between the camera body and the photographing lens or the accessory, not only does the construction of the photographing lens or the accessory become complex, but also the load on the control circuit provided in the photographing lens or the accessory becomes large, and thus, the inherent function of the photographing lens or the accessory maybe lowered. Especially, in the case of a photographing lens, it is preferable that a large load does not act on the control circuit, since prompt lens drive control is required.

SUMMARY OF THE INVENTION

Therefore, an object of the present invention is to provide an electric power control device, which can cut the supply electric power without placing a large load on a photographing lens or an accessory when an abnormal state occurs while electric power is being supplied to the photographing lens or the accessory.

According to the present invention, there is provided an electric power control device for a camera having a camera body and a photographing lens which can be attached to and detached from said camera body, the device comprising an electric power source, a monitoring processor, a detecting processor, and a control processor.

The electric power source is provided in the camera body to supply electric power to the photographing lens. The monitoring processor is provided in the camera body to monitor the electric power supplied to the photographing lens and to output a monitor signal in accordance with the electric power. The detecting processor is provided in the camera body to detect whether the electric power is abnormal, based on the monitor signal. The control processor is provided in the camera body to start the supply of electric power from the electric power source to the photographing lens, and stop the electric power supply when the detecting processor detects an abnormal state.

Due to this, when an abnormal state occurs when electric power is supplied from the camera body to the photographing lens, the abnormal state is definitely detected, and since the electric power supply is cut when the abnormal state is detected, electric parts provided in the photographing lens are prevented from being damaged by the excess electric current.

Preferably, the detecting processor comprises a switch that turns ON and OFF in accordance with the monitor signal, and detects the abnormal state based on the ON and OFF state of the switch. The detecting processor may A/D-convert the monitor signal to obtain an A/D-converted value, and compare the A/D-converted value with a predetermined value to detect the abnormal state.

Further, according to the present invention, there is provided an electric power control device for a camera having a camera body and an accessory which can be attached to and detached from said camera body, the device comprising an electric power source, a monitoring processor, a detecting processor, and a control processor.

The electric power source is provided in the camera body to supply electric power to the accessory. The monitoring processor is provided in the camera body to monitor the electric power supplied to the accessory and output a monitor signal in accordance with the electric power. The detecting processor is provided in the camera body to detect whether the electric power is abnormal, based on the monitor signal. The control processor is provided in the camera body to start the supply of electric power from the electric power source to the accessory, and to stop the electric power supply when the detecting processor detects an abnormal state.

BRIEF DESCRIPTION OF THE DRAWINGS

The objects and advantages of the present invention will be better understood from the following description, with reference to the accompanying drawings in which:

FIGS. 2A and 2B show a flowchart of a main routine executed in a micro-computer provided in the camera body;

DESCRIPTION OF THE PREFERRED EMBODIMENTS

Figure 1:
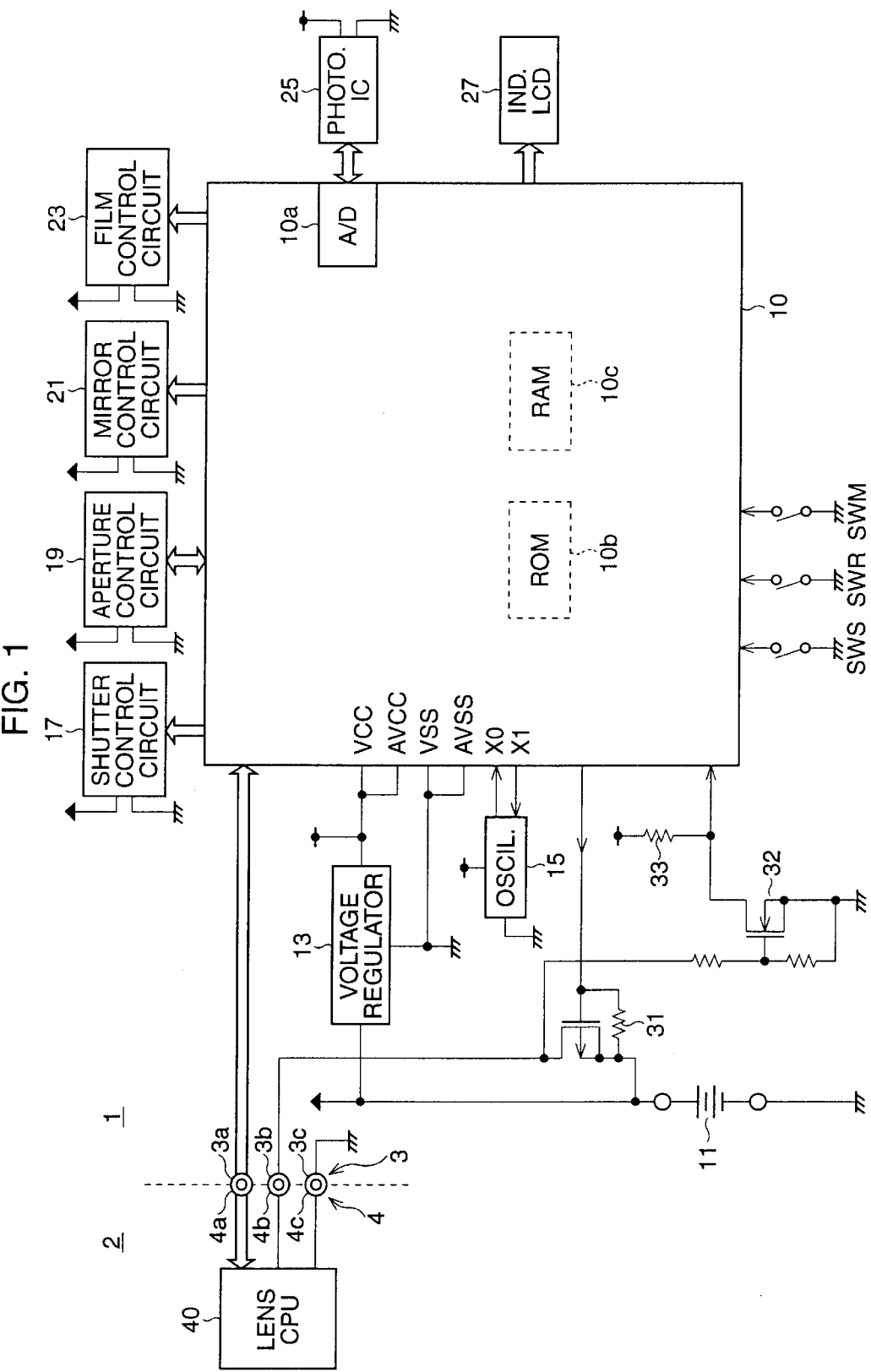
FIG. 1 is a block diagram showing a first embodiment of a camera system to which the present invention is applied.

The present invention will be described below with reference to the embodiments shown in the drawings.

FIG. 1 shows a first embodiment of a camera system to which the present invention is applied. The camera system has a camera body 1 and a photographing lens 2, which can be attached to and detached from the camera body 1.

The camera body 1 is provided with a mount (not shown) having an electric terminal unit 3, and the photographing lens 2 is provided with a mount (not shown) having an electric terminal unit 4. When the photographing lens 2 is normally attached to the camera body 1, the electric terminal units 3 and 4 are electrically connected. The electric terminal unit 3 contains a communication terminal 3a, an electric power terminal 3b, and a ground terminal 3c, and the electric terminal unit 4 contains a communication terminal 4a, an electric power terminal 4b, and a ground terminal 4c. Thus, in the attached state, electric power is supplied from the camera body 1 to the photographing lens 2 through the electric power terminals 3b and 4b. The lens CPU (i.e., a micro-computer) 40 of the photographing lens 2 can perform a data communication with the camera CPU (i.e., a micro-computer) 10 of the camera body 1, through the communication terminals 3a and 4a, so that the camera body 1 can obtain lens inherent information, such as a fully-open aperture value, a focal distance, and so on.

The CPU 10 is provided with a ROM 10b, in which a program relating to a function of the camera system is installed, a RAM 10c, in which various parameters and so on used for control or calculations are temporarily stored, and an A/D converter 10a, which A/D-converts an input signal, and thus, the CPU 10 functions as a controller which controls operations of the camera body 1 as a whole. Electric voltage of a battery 11 mounted in a battery chamber (not shown) of the camera body 1 is applied to the CPU 10 as a constant voltage through a voltage regulator 13. The CPU 10 performs predetermined operations in synchronization with clock pulses output from an oscillator 15, which is operated by the constant voltage supplied by the voltage regulator 13.

A photometry switch SWS, a release switch SWR, and a main switch SWM are connected to the CPU 10. The photometry switch SWS is turned ON when the shutter button (not shown) is partly depressed. The release switch SWR is turned ON when the shutter button is fully depressed. The main switch SWM is turned ON by an operator. When turning ON the main switch SWM, the CPU 10 is actuated so that electric power is supplied to peripheral circuits connected to the CPU 10, and thus, an operation corresponding to the operated switch is performed.

When the photometry switch SWS is turned ON, the CPU 10 executes an AE calculation based on a photometry signal output from a photometry IC 25, the film sensitivity, and so on, to obtain an optimum shutter speed and aperture value. Information required for photography, such as the shutter speed and the aperture value obtained by the AE calculation, is indicated on an indication LCD 27. The photometry IC 25 receives the part of the luminous flux coming from the subject, and outputs an electric signal (or a photometry signal) corresponding to the received amount of luminous flux, to the CPU 10. The photometry signal output from the photometry IC 25 is A/D-converted by the A/D converter 10a, and input to the CPU 10.

When the release switch SWR is turned ON, the CPU 10 performs a release process. Namely, a mirror motor (not shown) is activated by a mirror control circuit 21, to move up the mirror to the horizontal or photographing position, and an aperture control circuit 19 is operated based on the optimum aperture value obtained by the AE calculation to stop down the aperture of the photographing lens 2. Then, a shutter control circuit 17 is operated based on the optimum shutter speed to expose the film. When the exposure is completed, the mirror motor is operated by the mirror control circuit 21, to move down the mirror to the inclined or subject observing position, and springs for moving the leading-shutter-curtain and trailing-shutter-curtain are charged. Further, the CPU 10 activates a film motor (not shown) through a film control circuit 23 to wind the film by one frame.

When the photographing lens 2 is attached to the camera body 1, the CPU 10 turns ON a first MOSFET 31, so that electric power is supplied from the battery 11 to the photographing lens 2 through the electric power terminals 3b and 4b. At this time, the CPU 10 monitors the supplied electric power through a second MOSFET 32, to check whether the electric power supply is being normally carried out. The check is performed based on a power-monitor monitor signal which is changed in accordance with the ON-OFF state of the second MOSFET 32.

In the embodiment, when the supply of electric power is normal, the output voltage of the first MOSFET 31 is high, and thus, the second MOSFET 32 is turned ON. In this ON-state, since a pull-up resistor 33 is grounded, a low power-source monitor signal is input to the CPU 10. Conversely, when the second MOSFET 32 is turned OFF, a high power-source monitor signal due to the pull-up resistor 33 is input to the CPU 10.

When the low power-source monitor signal is input to the CPU 10, i.e., when the second MOSFET 32 is turned ON, the CPU 10 determines that the electric power supply is normal, and when the high power-source monitor signal is input to the CPU 10, i.e., when the second MOSFET 32 is turned OFF, the CPU 10 determines that the electric power supply is abnormal. The CPU 10 maintains the supply of electric power by keeping the first MOSFET 31 turned ON when the normal state is recognized. Conversely, when the abnormal state is recognized, the CPU 10 turns OFF the first MOSFET 31 to cut the electric supply to the photographing lens 2 so that large electric current is prevented from flowing in the photographing lens 2.

Figure 2B:
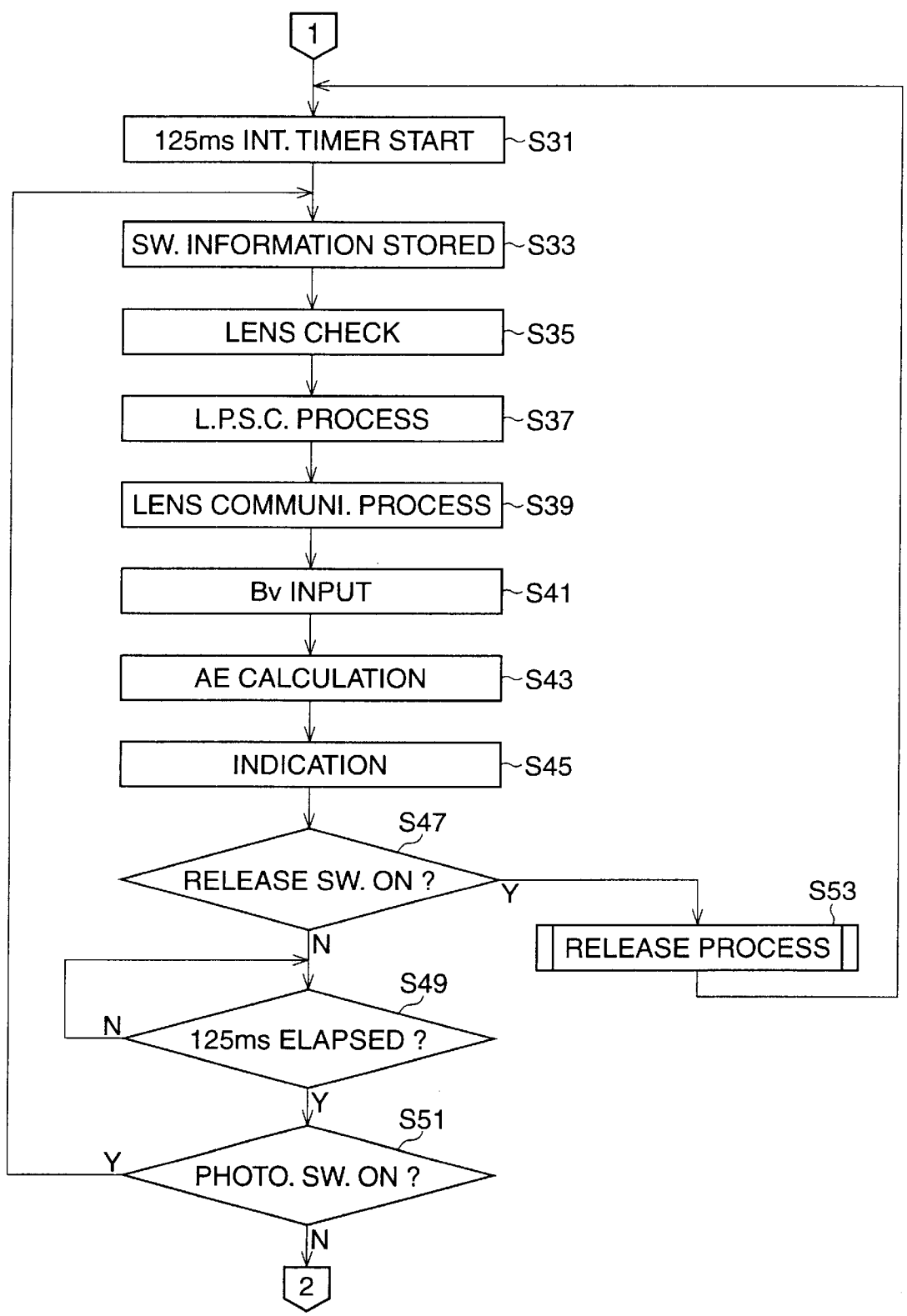
Figure 3:
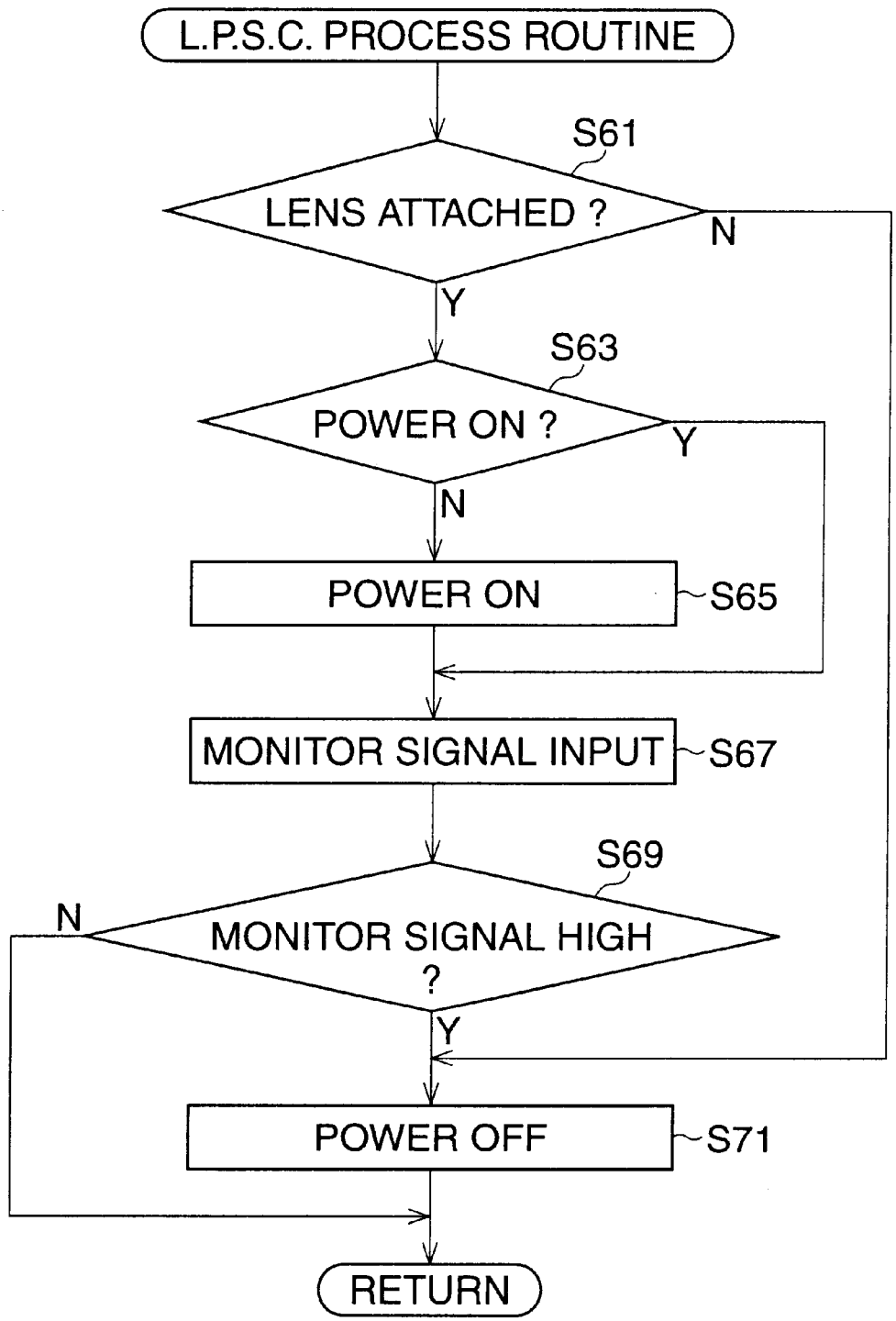
FIG. 3 is a flowchart of a lens power source control process routine executed in the micro-computer provided in the camera body.

With reference to FIGS. 2A, 2B, and 3 showing flowcharts of programs stored in the ROM 10b, an operation of the camera system of the first embodiment will be described below.

FIGS. 2A and 2B show a main routine, which is executed by the CPU 10 provided in the camera body 1 when the battery 11 is mounted in the camera body 1. When the battery 11 is mounted in the camera body 1, Step S11 is executed in which input/output ports, the RAM 10c, and so on are initialized, and Step S13 is executed in which peripheral circuits such as the shutter control circuit 17 etc., connected to the CPU 10, are initialized. Step S15 is then executed so that switch information indicating the ON-OFF status of the switches SWS, SWR, and SWM is input and stored in the RAM 10c, and an indication process is performed in Step S17. In the indication process, information required before a photographing operation, such as the number of photographed pictures, is indicated on the indication LCD 27.

In Step S19, the switch information stored in the RAM in Step S15 is used to check whether the photometry switch SWS is turned ON. When the photometry switch SWS is not turned ON, Step S21 is executed in which it is checked whether the release switch SWR is turned ON. When neither the photometry switch SWS nor the release switch SWR is turned ON, the process goes to Step S23, in which interruption of ON signals, output from the photometry switch SWS and the release switch SWR, is authorized, and Step S25 is executed in which a low electric-power consumption mode (i.e., a sleep state) is set. In the low electric-power consumption mode, when the photometry switch SWS or the release switch SWR is turned ON, a normal mode is resumed in Step S27. Then, Step S29 is executed in which the interruption of ON signals, output from the photometry switch SWS and the release switch SWR, is prohibited, and the process goes back to Step S15.

When it is determined in Step S19 that the photometry switch SWS is turned ON, or when it is determined in Step S21 that release switch SWR is turned ON, Step S31 is executed in which a 125 ms interval timer is started, and Step S33 is executed in which the switch information is input and stored in the RAM 10c. Then, after it is confirmed in Step S35 that the photographing lens 2 is attached to the camera body 1, Step S37 is executed in which a lens power source control process routine is performed. In the lens power source control process routine, electric power is supplied to the photographing lens 2 if the photographing lens 2 is attached to the camera body 1, and the electric power supply is stopped if the photographing lens 2 is not attached to the camera body 1. Further, while the electric power is supplied, the supplied voltage to the photographing lens 2 is monitored, and if an abnormal state is sensed, the electric power supply is stopped. Note that, although, in Step S35, data communication is performed between the photographing lens 2 and the camera body 1 so that the state of attachment of the lens is checked, it is possible that a switch, which turns ON when a photographing lens is attached to the camera body 1, is provided for checking the state of attachment of the lens based on switch information output from the switch.

Then, in Step S39, a lens communication process is performed so that lens information, such as a photographing distance information and a focal distance, is input to the CPU 10. Note that the lens communication process is not performed, when a photographing lens having no lens CPU is attached to the camera body 1, when no photographing lens is attached to the camera body 1, and when a photographing lens is attached to the camera body and electric power is not supplied to the photographing lens.

After the lens communication process, in Step S41, a photometry value Bv (i.e., a photometry signal) is input from the photometry IC 25, and in Step S43, a photometry calculation (i.e., an AE calculation) is performed based on the photometry value Bv, a film sensitivity etc., to obtain an optimum shutter speed and aperture value, which are indicated by the indication LCD 27 in Step S45. Note that the photometry value Bv is first A/D-converted by the A/D converter 10a, and is then input to the CPU 10.

Then, it is determined in Step S47 whether the release switch SWR is turned ON. When the release switch SWR is turned ON, a release process is performed in Step S53, and the process goes back to Step S31. Conversely, when the release switch SWR is not turned ON, Step S49 is executed so that the process waits until 125 ms has elapsed. Then, when 125 ms has elapsed, it is determined in Step S51 whether the photometry switch SWS is turned ON. When the photometry switch SWS is turned ON, the process goes back to Step S31, and when the photometry switch SWS is not turned ON, the process goes back to Step S15.

With reference to FIG. 3, the lens power source control process routine performed in Step S37 will be described below. First, it is determined in Step S61 whether a photographing lens is attached to the camera body 1 based on the check result of Step S35. When the photographing lens is not attached to the camera body 1, Step S71 is executed in which the first MOSFET 31 is turned OFF so that the electric power supply to the photographing lens is cut, and the process goes back to the main routine.

Conversely, when the photographing lens is attached, Step S63 is executed in which the supply of electric power is checked based on the ON/OFF state of the first MOSFET 31. If the electric power is not being supplied, Step S65 is executed in which the first MOSFET 31 is turned ON, so that the electric power supply to the photographing lens is started. When it is determined in Step S63 that the first MOSFET 31 is turned ON to supply the electric power, Step S65 is skipped. Step S67 is then executed in which a power-source monitor signal is input to the CPU 10, and then in Step S69 the strength of the power-source monitor signal is checked. When the power-source monitor signal is high, the first MOSFET 31 is turned OFF, so that the electric power supply to the photographing lens is stopped. Then, the process goes back to the main routine. Conversely, when the power-source monitor signal is not high, Step S71 is skipped, and the process goes back to the main routine. Thus, if any abnormal state occurs in the supply of electric power to the photographing lens, the power-source monitor signal is high, and excess current is prevented from building up due to Step S71.

As described above, in the first embodiment, the electric power supply to the photographing lens is monitored through the second MOSFET 32 provided in the camera body 1, an abnormal state in the photographing lens is readily detected with a simple structure. Therefore, when any abnormal state occurs in the photographing lens, the electric power supply is cut so that electric parts provided in the photographing lens are prevented from being damaged. Further, since communication for monitoring the supplied voltage is not needed, the photographing lens is not required to have a circuit for monitoring the supplied voltage, and thus, the load on the photographing lens is reduced.

Figure 4:
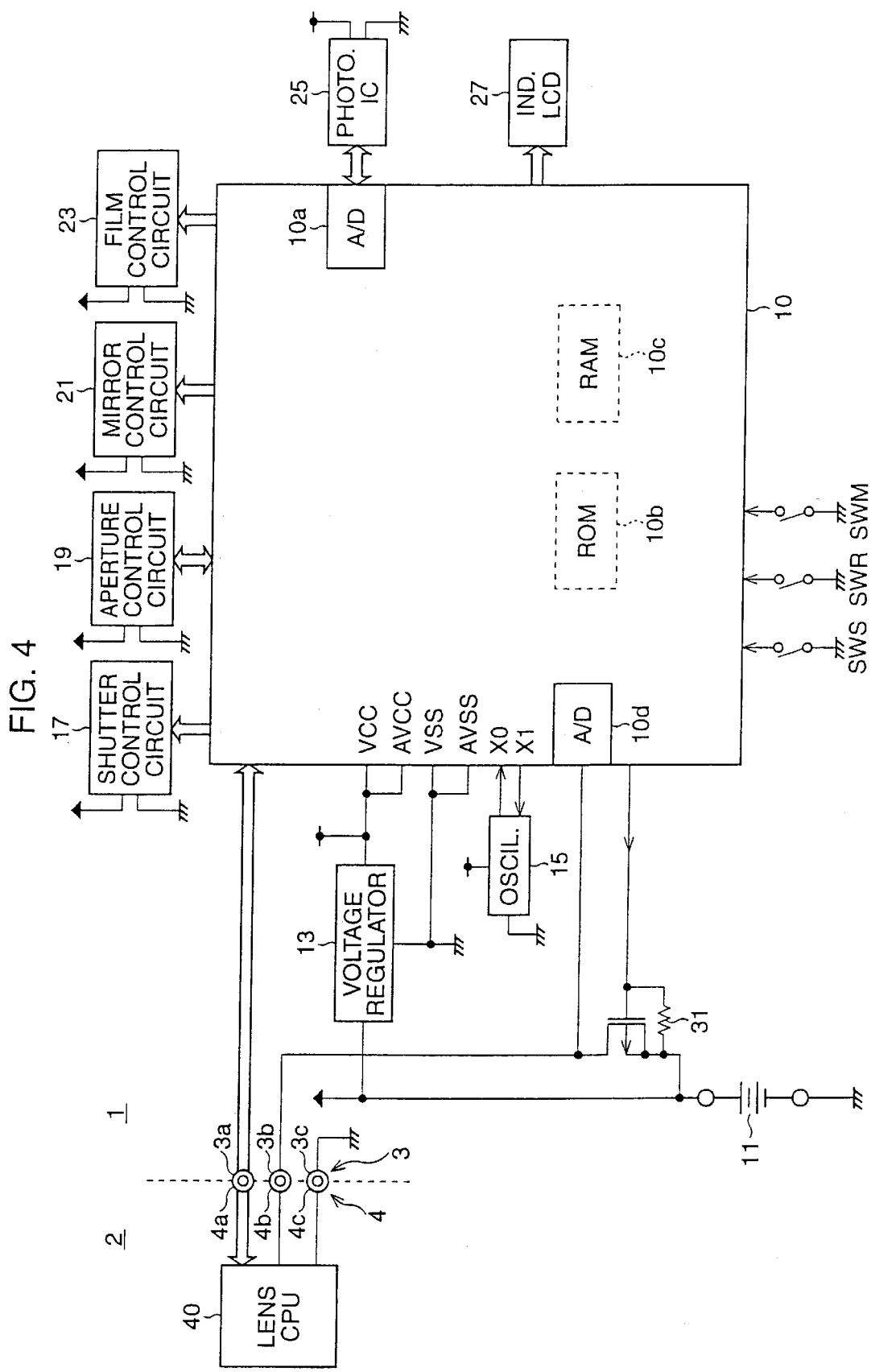
FIG. 4 is a block diagram showing a second embodiment of a camera system.

With reference to FIG. 4, a second embodiment of the camera system will be described below. FIG. 4 shows a block diagram, which is almost the same as FIG. 1, and corresponding parts are indicated by the same references as those of FIG. 1. Explanations of the corresponding parts are omitted.

Output voltage from the first MOSFET 31 is A/D-converted in an A/D converter 10d, and the A/D converted voltage signal is input to the CPU 10 as a power-source monitor signal. The CPU 10 compares the input A/D converted value (i.e., the power-source monitor signal) with a predetermined reference value, and based on the comparison result, it is determined whether the electric power supply is normal. In this embodiment, when the electric power supply is normal, the output voltage of the first MOSFET 31 is high, and the A/D converted value exceeds the reference value. Therefore, when the A/D converted value becomes less than the reference value, it is considered that there is an abnormal state. The CPU 10 determines that there is a normal supply when the A/D converted value exceeds the reference value, the first MOSFET 31 is kept ON to continue the electric power supply. Conversely, when the A/D converted value is lower than the reference value, the CPU 10 determines that the supply is abnormal, and turns OFF the first MOSFET 31 to cut the electric power supply to the photographing lens.

Figure 5:
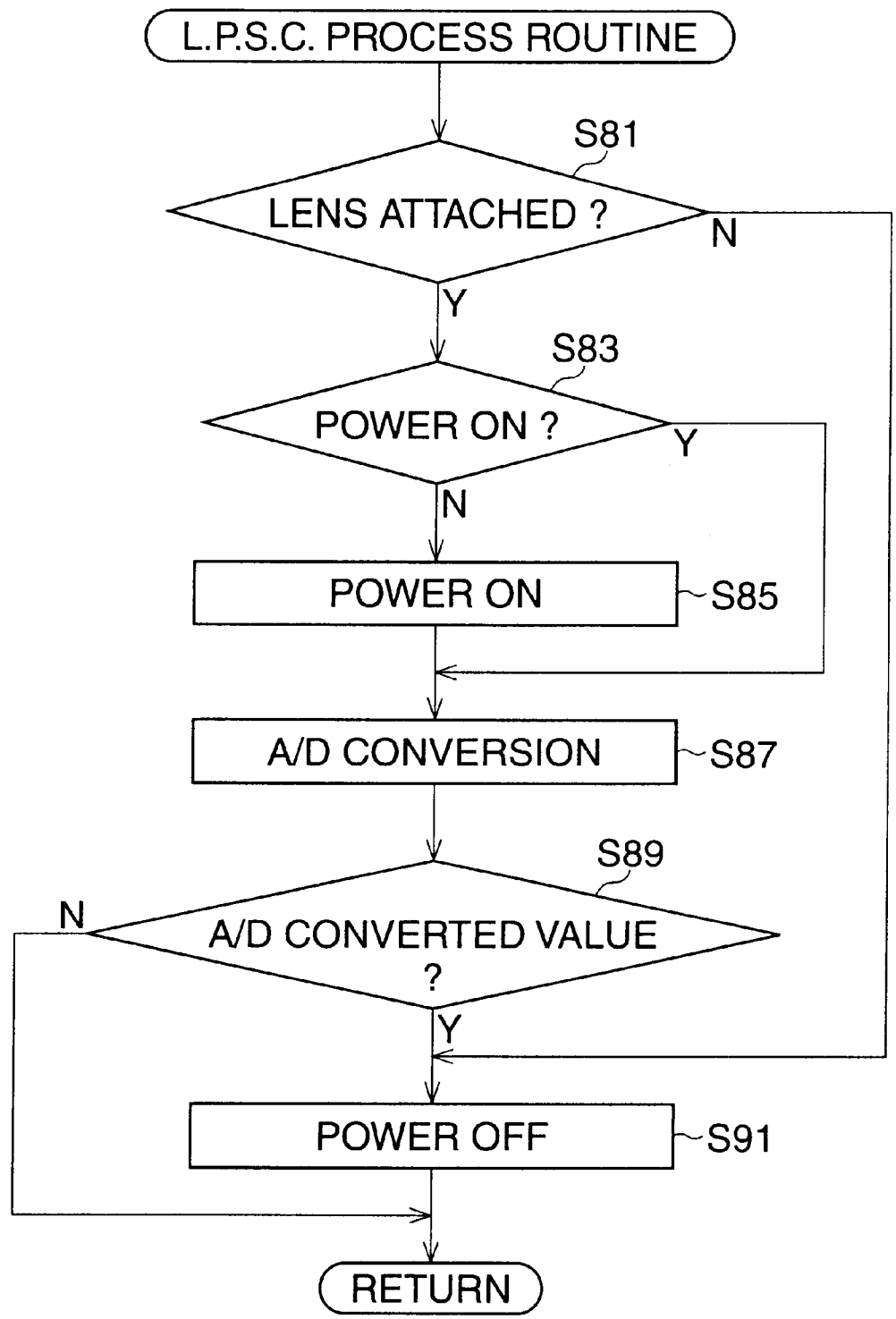
FIG. 5 is a flowchart of a lens power source control process routine in the second embodiment.

An operation of the camera body 1 of the second embodiment will be described below. The main routine is identical with that shown in FIGS. 2A and 2B, and therefore, only the lens power source control process routine will be described, with reference to FIG. 5.

The lens power source control process routine is executed in Step S37 of the main routine (FIG. 2). First, it is determined in Step S81 whether a photographing lens is attached to the camera body 1 based on the result of Step S35. When the photographing lens is not attached to the camera body 1, Step S91 is executed in which the first MOSFET 31 is turned OFF so that the electric power supply to the photographing lens is cut, and the process goes back to the main routine.

Conversely, when the photographing lens is attached, Step S83 is executed in which it is checked based on the ON/OFF state of the first MOSFET 31 whether electric power is being supplied. If the electric power is not being supplied, Step S85 is executed in which the first MOSFET 31 is turned ON, so that the electric power supply to the photographing lens is started. When it is determined in Step S83 that the first MOSFET 31 is turned ON to supply the electric power, Step S85 is skipped. Step S87 is then executed in which an output signal of the first MOSFET 31 is A/D-converted and input to the CPU 10, and then in Step S89 it is checked whether the A/D converted value is lower than the reference value. When the A/D converted value is lower than the reference value, the first MOSFET 31 is turned OFF, so that the electric power supply to the photographing lens is stopped. Then, the process goes back to the main routine. Conversely, when the A/D converted value is not lower than the reference value, Step S91 is skipped, and the process goes back to the main routine.

As described above, in the second embodiment, the output voltage of the first MOSFEET 31 is A/D converted and input to the CPU 10, so that the voltage supplied to the photographing lens is monitored through the A/D converted value. Accordingly, an abnormal state in the photographing lens is readily detected with the simple structure. Thus, the same effect as that in the first embodiment is obtained by the second embodiment.

Figure 6:
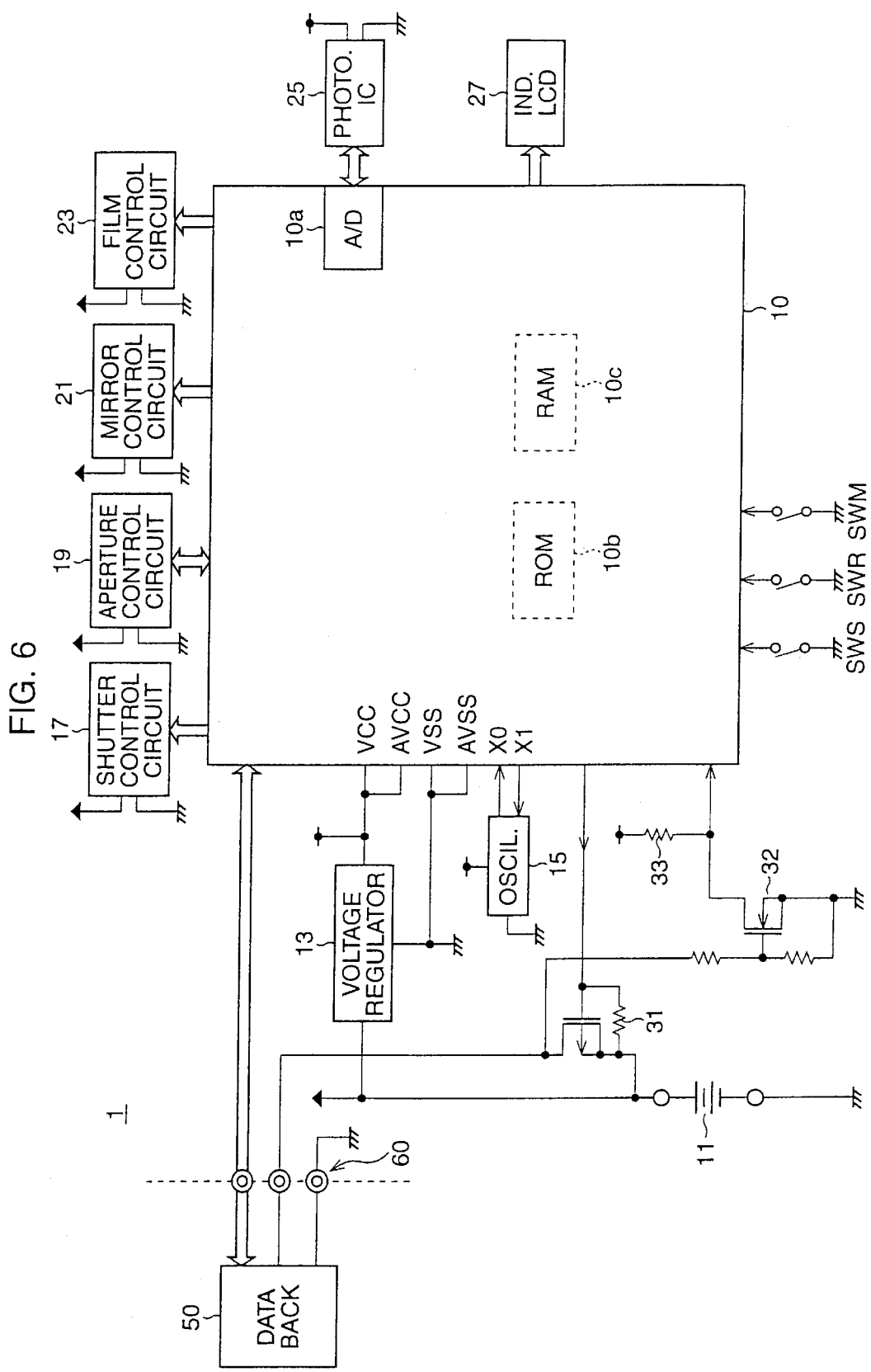
FIG. 6 is a block diagram showing a third embodiment of a camera system.

FIG. 6 shows a block diagram, which is almost the same as FIG. 1, and corresponding parts are indicated by the same references as those of FIG. 1. The different part is a data back 50, which is an accessory in a camera system. The other structures are identical to those in the first embodiment.

The data back 50 is provided on the back lid of the camera body 1 to indicate photographing date, which is to be recorded on the photographed picture. The data back 50 has a liquid crystal display, for example, and is electrically connected to the camera body 1 through an electric terminal unit 60, having electric contacts which open and close by opening and closing the back lid. An abnormal state in the data back 60 caused by excess current flowing in a circuit provided in the data back 60, is prevented by an operation similar to the lens power source control process routine described above.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2001-048137 (filed on Feb. 23, 2001) which is expressly incorporated herein, by reference, in its entirety.

What is claimed is:

1. An electric power control device for a camera having a camera body and a photographing lens which can be attached to and detached from said camera body, said device comprising:

an electric power source that is provided in said camera body to supply electric current to said photographing lens;

a monitoring processor that is provided in said camera body to monitor said electric current supplied to said photographing lens and output a monitor signal in accordance with said electric current;

a detecting processor that is provided in said camera body to detect whether said electric current is excessive, based on said monitor signal; and a control processor that is provided in said camera body to start the supply of electric current from said electric power source to said photographing lens, and that stops the electric current supply when said detecting processor detects an abnormal state of excessive current, wherein said detecting processor comprises a switch that turns ON and OFF in accordance with said monitor signal, and detects the abnormal state based on the ON and OFF state of said switch.

2. An electric power control device for a camera having a camera body and an accessory which can be attached to and detached from said camera body, said device comprising:

an electric power source that is provided in said camera body to supply electric current to said accessory;

a monitoring processor that is provided in said camera body to monitor said electric current supplied to said accessory and output a monitor signal in accordance with said electric current;

a detecting processor that is provided in said camera body to detect whether said electric current is excessive, based on said monitor signal; and a control processor that is provided in said camera body, that starts the supply of electric current from said electric power source to said accessory, and that stops the electric current supply when said detecting processor detects an abnormal state of excessive current, wherein said detecting processor comprises a switch that turns ON and OFF in accordance with said monitor signal, and detects the abnormal state based on the ON and OFF state of said switch.

* * * * *